(12) United States Patent
Kallen et al.

(10) Patent No.: US 11,645,042 B2
(45) Date of Patent: May 9, 2023

(54) FLOAT DIVISION BY CONSTANT INTEGER

(71) Applicant: Imagination Technologies Limited, Kings Langley (GB)

(72) Inventors: Jonas Kallen, Hisings Backa (SE); Sam Elliott, London (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 17/547,071

(22) Filed: Dec. 9, 2021

(65) Prior Publication Data

US 2022/0100471 A1 Mar. 31, 2022

Related U.S. Application Data

(63) Continuation of application No. 16/548,359, filed on Aug. 22, 2019, now Pat. No. 11,294,634.

(30) Foreign Application Priority Data

Aug. 22, 2018 (GB) ..................................... 1813701

(51) Int. Cl.
*G06F 7/556* (2006.01)
*G06F 7/72* (2006.01)
*G06F 7/487* (2006.01)

(52) U.S. Cl.
CPC ............ *G06F 7/556* (2013.01); *G06F 7/4873* (2013.01); *G06F 7/727* (2013.01)

(58) Field of Classification Search
CPC .... G06F 7/72–721; G06F 7/726; G06F 7/727; G06F 7/729; G06F 7/4873; G06F 7/535; G06F 7/537; G06F 7/5375
See application file for complete search history.

(56) References Cited

U.S. PATENT DOCUMENTS 4,281,391 A * 7/1981 Huang .................... H03M 7/18
341/83
9,753,693 B2 9/2017 Rose
(Continued)

FOREIGN PATENT DOCUMENTS

GB 2555459 A 5/2018

OTHER PUBLICATIONS

H.F. Ugurdag et al., Hardware division by small integer constants, IEEE transactions on Computer, vol. 66:12, pp. 1-14, IEEE Computer Society, 2017 (Year: 2017).*

(Continued)

*Primary Examiner* — Emily E Larocque
(74) *Attorney, Agent, or Firm* — Potomac Law Group, PLLC; Vincent M DeLuca

(57) ABSTRACT

A binary logic circuit for determining the ratio x/d where x is a variable integer input, the binary logic circuit comprising: a logarithmic tree of modulo units each configured to calculate x[a:b]mod d for respective block positions a and b in x where b>a with the numbering of block positions increasing from the most significant bit of x up to the least significant bit of x, the modulo units being arranged such that a subset of M-1 modulo units of the logarithmic tree provide x[0:m]mod d for all m∈{1, M}, and, on the basis that any given modulo unit introduces a delay of 1: all of the modulo units are arranged in the logarithmic tree within a delay envelope of $\lceil \log_2 M \rceil$; and more than $M-2^u$ of the subset of modulo units are arranged at the maximal delay of $\lceil \log_2 M \rceil$, where $2^u$ is the power of 2 immediately smaller than M.

20 Claims, 6 Drawing Sheets

(56) References Cited

U.S. PATENT DOCUMENTS

| | | |
|---|---|---|
| 10,235,135 B2 | 3/2019 | Rose |
| 2002/0032711 A1* | 3/2002 | Morioka .............. G06F 7/726 708/492 |
| 2012/0158812 A1* | 6/2012 | Hirsch .................. G06F 7/72 708/653 |
| 2013/0124592 A1 | 5/2013 | Manohar et al. |
| 2017/0010862 A1* | 1/2017 | Nystad ................. H03K 19/20 |
| 2018/0121166 A1 | 5/2018 | Rose |

OTHER PUBLICATIONS

Beame et al., "Log Depth Circuits for Division and Related Problems," Society for Industrial and Applied Mathematics, J. Comput., vol. 15, No. 4, Nov. 1986, pp. 994-1003.

Srinivasan et al., "Constant-division Algorithms," IEE Proceedings Computer and Digital Technology, vol. 141, No. 6, Nov. 1994, pp. 334-340.

Petry, et al., "Division Techniques for Integers of the Form 2N 1," International Journal of Electronics, May 1993, vol. 74:5, p. 659-670, Taylor and Francis.Ltd. London, Great Britain.

Ugurdag, et al., "Hardware Division by Small Integer Constants," IEEE Transactions on Computer, Dec. 2017, vol. 66:12, pp. 1-14, IEEE Computer Society.

(Note: NPL documents in parent apn).

* cited by examiner

| MSB | 0 | 1 | 2 | 3 | 4 | 5 | 6 | LSB |
|---|---|---|---|---|---|---|---|---|
| $x$ | 0 | 1 | 0 | 1 | 1 | 0 | 1 | |

FLOAT DIVISION BY CONSTANT INTEGER

CROSS-REFERENCE TO RELATED APPLICATIONS AND CLAIM OF PRIORITY

This application is a continuation under 35 U.S.C. 120 of copending application Ser. No. 16/548,359 filed Aug. 22, 2019, which claims foreign priority under 35 U.S.C. 119 from United Kingdom Application No. 1813701.8 filed Aug. 22, 2018.

BACKGROUND

The present disclosure relates to a binary logic circuit for determining the ratio $$\frac{x}{d},$$

where x is a variable of known length and d is a constant integer.

It is a common requirement in digital circuits that hardware is provided for calculating a ratio $$\frac{x}{d}$$

for some input x, where d is some constant integer known at design time. Such calculations are frequently performed and it is important to be able to perform them as quickly as possible in digital logic so as to not introduce delay into the critical path of the circuit.

Binary logic circuits for calculating a ratio $$\frac{x}{d}$$

are well known. For example, circuit design is often performed using tools which generate circuit designs at the register-transfer level (RTL) from libraries of logic units which would typically include a logic unit for calculating a ratio $$\frac{x}{d}.$$

Such standard logic units will rarely represent the most efficient logic for calculating $$\frac{x}{d}$$

in terms of circuit area consumed or the amount of delay introduced into the critical path.

Conventional logic for calculating a ratio $$\frac{x}{d}$$

typically operates in one of two ways. A first approach is to evaluate the ratio according to a process of long division. This approach can be relatively efficient in terms of silicon area consumption but requires of the order of w sequential operations which introduce considerable latency, where w is the bit width of x. A second approach is to evaluate the ratio by multiplying the input variable x by a reciprocal:

$$\frac{x}{d} = x \cdot \frac{1}{d} = x \cdot c \quad (1)$$

Thus the division of variable x by d may be performed using conventional binary multiplier logic arranged to multiply the variable x by a constant c evaluated at design time. This approach can offer low latency but requires a large silicon area.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a binary logic circuit for determining the ratio x/d where x is a variable integer input of w bits comprising M>8 blocks of bit width r≥1 bit, and d>2 is a fixed integer, the binary logic circuit comprising:

a logarithmic tree of modulo units each configured to calculate x[a:b]mod d for respective block positions a and b in x where b>a with the numbering of block positions increasing from the most significant bit of x up to the least significant bit of x, the modulo units being arranged such that a subset of M−1 modulo units of the logarithmic tree provide x[0:m]mod d for all m∈{1, M}, and, on the basis that any given modulo unit introduces a delay of 1:

(a) all of the modulo units are arranged in the logarithmic tree within a delay envelope of $\lceil \log_2 M \rceil$; and (b) more than M−$2^u$ of the subset of modulo units are arranged at the maximal delay of $\lceil \log_2 M \rceil$, where $2^u$ is the power of 2 immediately smaller than M;

and output logic configured to combine the outputs provided by the subset of modulo units with blocks of the input x so as to yield the ratio x/d.

The divisor may be d=$2^n$+1 for integer n≥2.

The number of blocks of the input may be M=$2^v$+1 for integer v≥3 and at least two modulo units may be arranged at the maximal delay of $\lceil \log_2 M \rceil$.

Each modulo unit may receive a pair of input values, each input value being, depending on the position of the modulo unit in the logarithmic tree, a block of the input x or an output value from another modulo unit, and each modulo unit being configured to combine its pair of input values and perform its mod d operation on the resulting binary value.

The modulo units of the logarithmic tree may be arranged in a plurality of stages, where no modulo unit of a given stage receives an input value from a modulo unit of a higher stage, the modulo units of a first, lowest stage are each arranged to receive a pair of adjacent blocks from the input x as input values, and the modulo units of each higher $S^{th}$ stage are arranged to receive at least one input from the $(S−1)^{th}$ stage of modulo units.

Each modulo unit of the first stage may be configured to operate on a pair of input values comprising 2r bits.

Each modulo unit may be configured to provide an output value of bit width p bits and each modulo unit of a higher stage is configured to operate on:
  a pair of input values comprising r+p bits for a modulo unit arranged to receive one of its blocks from input x; and
  a pair of input values comprising 2p bits for a modulo unit arranged to receive output values from other modulo units as its pair of input values.

The number of blocks of the input may be $$\lceil \frac{w}{r} \rceil.$$

Optionally $$\lceil \frac{w}{r} \rceil \neq \frac{w}{r}$$

and one or more of the blocks of the input may have a bit width other than r bits.

Optionally $$\lceil \frac{w}{r} \rceil \neq \frac{w}{r}$$

and one or more of the blocks of the input may be padded with bits such that all blocks of the input are of bit width r bits.

The bit width of each x[0:m]mod d provided by the logarithmic tree may be equal to the minimum bit width p required to express the range of possible outputs of a mod d operation.

The number of blocks of the input may be at least 24 blocks.

There is provided a binary logic circuit for determining the ratio x/d where x is a variable integer input of w bits comprising M>8 blocks of bit width r≥1 bit, and d>2 is a fixed integer, the binary logic circuit comprising:
  a logarithmic tree of modulo units each configured to calculate x[a:b]mod d for respective block positions a and b in x where b>a with the numbering of block positions increasing from the most significant bit of x up to the least significant bit of x, the modulo units being arranged such that a subset of M−1 modulo units of the logarithmic tree provide x[0:m]mod d for all m∈{1, M−1}, and:
    on the basis that any given modulo unit introduces a delay of 1, all of the modulo units are arranged in the logarithmic tree within a delay envelope of $\lceil \log_2 M \rceil$; and
    at least one of the subset of modulo units is arranged to operate on a binary value comprising the negative value of (a) an output from a modulo unit x[e:f]mod d or (b) input block(s) x[e:f] and the value of x[0:f]mod d so as to calculate x[0:e]mod d, where e and f are block positions in x;
  and
  output logic configured to combine the outputs provided by the subset of modulo units with blocks of the input x so as to yield the ratio x/d.

There is provided a method of synthesising a binary logic circuit for determining the ratio x/d where x is a variable integer input of w bits comprising M>8 blocks of bit width r≥1 bit, and d>2 is a fixed integer, the binary logic circuit comprising a logarithmic tree of modulo units each configured to calculate x[a:b]mod d for respective block positions a and b in x where b>a with the numbering of block positions increases from the most significant bit of x up to the least significant bit of x, the method comprising:
  defining a first group of modulo units connected together so as to calculate the output values x[i:j−1]mod d for which there exists a positive integer, k, that satisfies j−i=$2^k$ and where i is an integer multiple of $2^k$; and
  adding a second group of modulo units connected into the logarithmic tree so as to provide outputs x[0:i]mod d not provided by the first group of modulo units, where a modulo unit of the second group arranged to provide an output x[0:i]mod d is configured to receive as input values from modulo units of the first group:
    a pair of output values x[0:j]mod d, x[j+1:i]mod d where j<i; or
    an output value x[0:j]mod d and the negative value of x[i+1:j]mod d where j>i;
  and
  defining output logic configured to combine output values x[0:m]mod d for all m∈{1, M−1} provided by a subset of modulo units of the logarithmic tree with blocks of the input x so as to yield the ratio x/d.

The method may further comprise defining a third group of modulo units connected into the logarithmic tree so as to provide output values x[0:i]mod d not provided by the first or second groups of modulo units by:
  identifying whether a first modulo unit of the third group can be added to the logarithmic tree in order to provide an output value x[j+1:i]mod d where j<i or an output value x[i+1:j]mod d where j>i which can be combined with an output value x[0:j]mod d of the first or second groups of modulo units at a second modulo unit of the third group to create an output value x[0:i]mod d; and
  responsive to a positive identification, adding into the logarithmic tree those first and second modulo units of the third group so as to provide the output value x[0:j]mod d.

The method may further comprise repeating the identifying and adding steps until no further modulo units can be added.

Said identifying may comprise selecting the sign of the input values of the first modulo unit of the third group so as to create the output value x[0:i]mod d.

In defining a modulo unit of the second or third groups, if there are multiple options for adding a modulo unit in order to provide x[0:i]mod d for a given i, all of which satisfy said criteria, the defining is performed so as to add a modulo unit of the multiple options which provides x[0:i]mod d at the lowest delay.

The method may further comprise, if output values x[0:i]mod d are not provided by modulo units of the of the first, second or third groups for any 1≤i≤M, adding, for each output value not provided, two or more modulo units of a fourth group to the logarithmic tree so as to provide that [0:i]mod d as an output value of a modulo unit of the fourth group.

The adding two or more modulo units of a fourth group may comprise using a nested linear search to identify the two or more modulo units required to form said output value.

The method may further comprise arranging the modulo units of the logarithmic tree such that a subset of M−1 modulo units of the logarithmic tree provide x[0:m]mod d for all m∈{1, M−1}, and, on the basis that any given modulo unit introduces a delay of 1, all of the modulo units are arranged in the logarithmic tree within a delay envelope of ⌈log $_2$M⌉.

The method may further comprise arranging the modulo units of the logarithmic tree such that more than M−2$^u$ of the subset of modulo units are arranged at the maximal delay of ⌈log $_2$M⌉, where 2$^u$ is the power of 2 immediately smaller than M.

There is provided a binary logic circuit for determining the ratio x/d where x is a variable integer input of w bits comprising M>8 blocks of bit width r≥1 bit, and d>2 is a fixed integer, the binary logic circuit comprising:

a logarithmic tree of modulo units each configured to calculate x[a:b]mod d for respective block positions a and b in x where b>a with the numbering of block positions increasing from the most significant bit of x up to the least significant bit of x, the modulo units being arranged such that a subset of M−1 modulo units of the logarithmic tree provide x[0:m]mod d for all m∈{1, M−1}, and, on the basis that any given modulo unit introduces a delay of 1, all of the modulo units are arranged in the logarithmic tree within a delay envelope of ⌈log $_2$M⌉; and output logic configured to combine the outputs provided by the subset of modulo units with blocks of the input x so as to yield the ratio x/d;

wherein the total number of modulo units T in the logarithmic tree for a given number of blocks M is in accordance with the following table:

| M | T |
|---|---|
| 24 | 46 |
| 25 | 48 |
| 26 | 51 |
| 27 | 54 |
| 28 | 58 |
| 29 | 61 |
| 30 | 65 |
| 31 | 69 |
| 32 | 74 |
| 33 | 60 |
| 34 | 62 |
| 35 | 64 |
| 36 | 67 |
| 37 | 69 |
| 38 | 72 |
| 39 | 74 |
| 40 | 78 |
| 41 | 80 |
| 42 | 83 |
| 43 | 85 |
| 44 | 89 |
| 45 | 91 |
| 46 | 94 |
| 47 | 96 |
| 48 | 101 |
| 49 | 103 |
| 50 | 106 |
| 51 | 109 |
| 52 | 113 |
| 53 | 116 |
| 54 | 120 |
| 55 | 123 |
| 56 | 128 |
| 57 | 131 |
| 58 | 135 |
| 59 | 139 |
| 60 | 144 |
| 61 | 148 |
| 62 | 153 |
| 63 | 158 |
| 64 | 164 |
| 65 | 133 |
| 66 | 135 |
| 67 | 137 |
| 68 | 140 |
| 69 | 142 |
| 70 | 145 |
| 71 | 147 |
| 72 | 151 |
| 73 | 153 |
| 74 | 156 |
| 75 | 158 |
| 76 | 162 |
| 77 | 164 |
| 78 | 167 |
| 79 | 169 |
| 80 | 174 |
| 81 | 176 |
| 82 | 179 |
| 83 | 181 |
| 84 | 185 |
| 85 | 187 |
| 86 | 190 |
| 87 | 192 |
| 88 | 197 |
| 89 | 199 |
| 90 | 202 |
| 91 | 206 |
| 92 | 210 |
| 93 | 214 |
| 94 | 217 |
| 95 | 219 |
| 96 | 225 |
| 97 | 227 |
| 98 | 230 |
| 99 | 233 |
| 100 | 237 |
| 101 | 240 |
| 102 | 244 |
| 103 | 247 |
| 104 | 252 |
| 105 | 255 |
| 106 | 259 |
| 107 | 262 |
| 108 | 267 |
| 109 | 270 |
| 110 | 274 |
| 111 | 277 |
| 112 | 283 |
| 113 | 286 |
| 114 | 290 |
| 115 | 294 |
| 116 | 299 |
| 117 | 303 |
| 118 | 308 |
| 119 | 313 |
| 120 | 319 |
| 121 | 323 |
| 122 | 328 |
| 123 | 333 |
| 124 | 339 |
| 125 | 344 |
| 126 | 350 |
| 127 | 356 |
| 128 | 363 |

There is provided a binary logic circuit for operating on a variable integer input x of w bits comprising M>8 blocks of bit width r≥1 bit, the binary logic circuit comprising:

a logarithmic tree of processing units each configured to perform a predefined operation on x[a:b] for respective block positions a and b in x where b>a with the numbering of block positions increasing from the most significant bit of x up to the least significant bit of x;

wherein the processing units are arranged such that a subset of M−1 processing units of the logarithmic tree each provide, for each m∈{1, M−1}, an output representing the result of the predefined operation on x[0:m]; and wherein, on the basis that any given processing unit introduces a delay of 1:
  (a) all of the processing units are arranged in the logarithmic tree within a delay envelope of $\lceil \log_2 M \rceil$; and
  (b) more than M−$2^u$ of the subset of processing units are arranged at the maximal delay of $\lceil \log_2 M \rceil$, where $2^u$ is the power of 2 immediately smaller than M.

The predefined operation performed at each processing unit of the logarithmic tree may be an AND operation and the binary logic circuit is configured to perform a plurality of AND reductions on blocks of the input x.

The predefined operation performed at each processing unit of the logarithmic tree may be an OR operation and the binary logic circuit is configured to perform a plurality of OR reductions on blocks of the input x.

The predefined operation performed at each processing unit of the logarithmic tree may be a XOR operation and the binary logic circuit is configured to perform a plurality of parity operations on blocks of the input x.

The binary logic circuit may be embodied in hardware on an integrated circuit. There may be provided a method of manufacturing, at an integrated circuit manufacturing system, the binary logic circuit. There may be provided an integrated circuit definition dataset that, when processed in an integrated circuit manufacturing system, configures the system to manufacture the binary logic circuit. There may be provided a non-transitory computer readable storage medium having stored thereon a computer readable description of an integrated circuit that, when processed in an integrated circuit manufacturing system, causes the integrated circuit manufacturing system to manufacture the binary logic circuit.

There may be provided an integrated circuit manufacturing system comprising:
  a non-transitory computer readable storage medium having stored thereon a computer readable integrated circuit description that describes the binary logic circuit;
  a layout processing system configured to process the integrated circuit description so as to generate a circuit layout description of an integrated circuit embodying the binary logic circuit; and
  an integrated circuit generation system configured to manufacture the binary logic circuit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION

Figure 1:
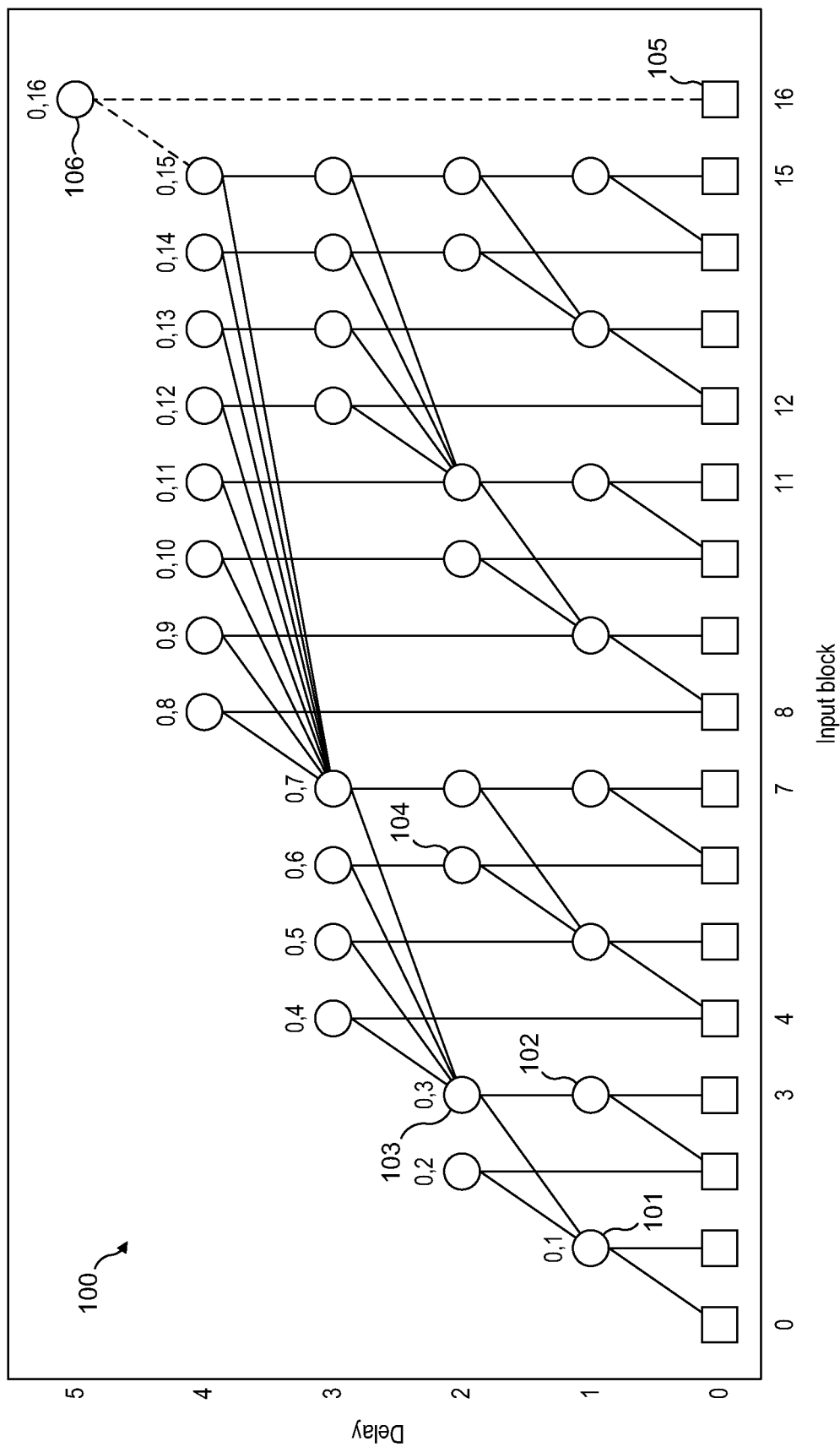
FIG. 1 shows a conventional logarithmic tree of modulo units for evaluating binary division of a 16-bit variable input by a constant integer divisor.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Examples described herein provide an improved binary logic circuit for calculating a ratio $$y = \frac{x}{d}$$

where x is a variable input of known bit width and d is a fixed integer divisor. In the examples described herein, x is an unsigned variable mantissa or integer input of bit width w bits, d is a positive integer divisor of the form $2^n \pm 1$, and y is the output which has q bits. For a given n and known bit width w of the binary input x, the shortest bit width of the binary ratio $$\frac{x}{d}$$

which can represent all possible outputs may be expressed as q:

$$q = \begin{cases} w - n + 1 & \text{if } d = 2^n - 1 \\ w - n & \text{if } d = 2^n + 1 \end{cases}$$

Division by a divisor of the related form $d = 2^p (2^n \pm 1)$ may be readily accommodated by right-shifting x by p before performing division by $2^n \pm 1$ according to the principles described herein. The set of division operations comprising divisors $2^n \pm 1$ and its related forms includes many of the most useful division operations for binary computer systems. Furthermore, when performing division operations of this set using logarithmic trees arranged according to the principles described herein, it is generally not necessary to consider alignment of the bits at each node of the tree. This follows because, for the $2^n - 1$ case, if we consider splitting x into upper and lower parts $x_1$ and $x_0$, with the lower part having width $2^k n$ (i.e. a power of 2 multiple of the n from the $2^n - 1$), then we can write:

$$x = x_0 + 2^{2^k n} x_1$$

Then, considering the operation of modulo units on that input:

$$x \pmod{2^n-1} = x_0 \pmod{2^{2^k n}-1} + (2^n x_1 \bmod 2^n-1) = x_0 \pmod{2^n-1} + ((2^{2^k n} \pmod{2^n-1})(x_1 \pmod{2^n-1})) \bmod 2^n-1$$

But since $$2^{2^k n} \pmod{2^n-1} = 1$$

for any k, we can simplify this to:

$$(x_0 \pmod{2^n-1} + x_1 \pmod{2^n-1}) \pmod{2^n-1}$$

For the $2^n+1$ case, also consider splitting x into upper and lower parts $x_1$ and $x_0$, with the lower part having width $2^k n$. Then, because $2^n \equiv -1 \pmod{2^n+1}$, the output values of the first modulo stage (see below for an explanation of stages) operating on $x_1$ and $x_0$ would be:

$$(x_0 \pmod{2^n+1} - x_1 \pmod{2^n+1}) \pmod{2^n+1}$$

For all higher stages the output values would be:

$$(x_0 \pmod{2^n+1} + x_1 \pmod{2^n+1}) \pmod{2^n+1}$$

It will therefore be appreciated that alignment of bits at each node of the logarithmic tree does not have to be considered provided that the input x is split into blocks of width $2^k n$, which is generally the natural choice.

It will be appreciated that the principles disclosed herein are not limited to the particular examples described herein and can be extended using techniques known in the art of binary logic circuit design to, for example, signed inputs x, various rounding schemes, and divisors other than $2^n \pm 1$ or its related forms. For example, d could in general be any integer with the alignment of bits at each node of the logarithmic tree being dealt with at design time in a suitable manner—as would be apparent to one skilled in the art of binary circuit design.

Figure 4:
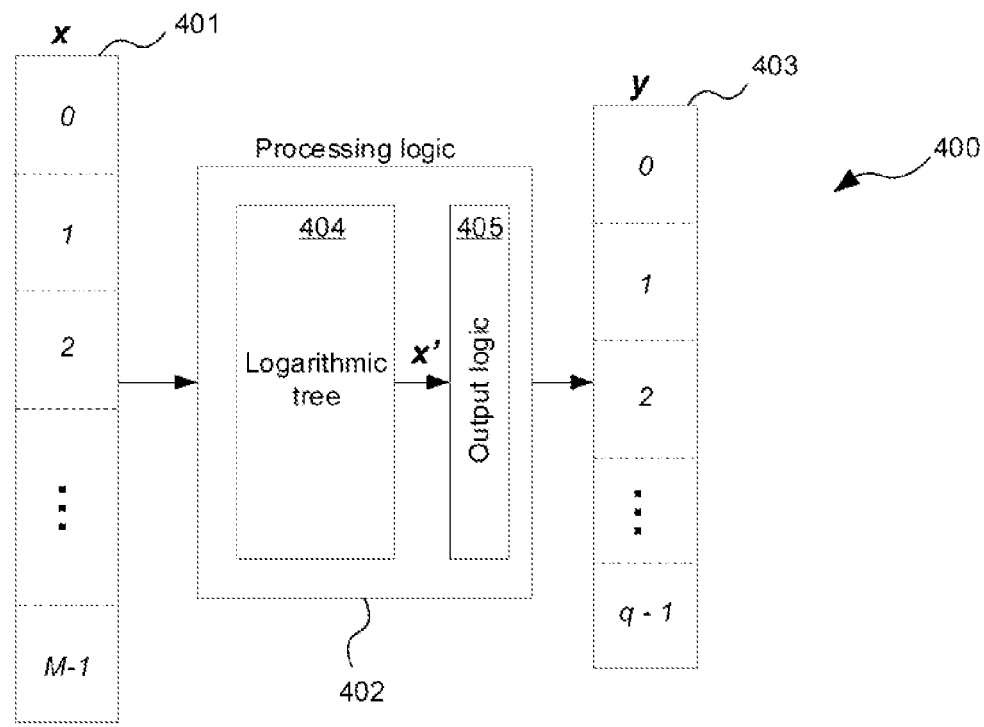
FIG. 4 shows a binary logic circuit configured to divide a variable input x by a constant integer at processing logic comprising a logarithmic tree of modulo units.

An exemplary binary logic circuit 400 for evaluating a ratio $$y = \frac{x}{d}$$

is shown in FIG. 4, where the divisor $d=2^n+1$ and the input variable x is an unsigned integer. As will be described, processing logic 402 is configured to operate on blocks of bits of the input variable x so as to generate an output y. The processing logic 402 comprises a logarithmic tree 404 of modulo units each configured to perform a modulo operation and arranged in the tree according to the principles described herein. As will be described, the output of the logarithmic tree 404 comprises a set of outputs from the modulo units of the tree. The processing logic 402 comprises output logic 405 configured to process the output x' of the logarithmic tree so as to form the final output $$y = \frac{x}{d}.$$

The circuit may comprise a data store 401 (e.g. one or more registers) for holding the bits of input variable x and a data store 403 (e.g. one or more registers) for holding the bits of output variable y.

The logarithmic tree 404 comprises a plurality of modulo units. The modulo units may be considered to be arranged in stages with all of the modulo units of a stage operating in parallel and each stage corresponding to a unit of delay. This general arrangement is set out in FIG. 1 which shows a conventional logarithmic tree of modulo units for calculating division by a fixed integer of a 16 block input (ignoring the dashed line and $17^{th}$ block). Each block comprises a plurality of bits as will be described. As in the example shown in FIG. 1, a first stage of modulo units (shown at the level of Delay=1 in FIG. 1) may be arranged to operate on blocks from the input x, a second stage of modulo units (Delay=2) may be arranged to receive at least one input from the first stage of modulo units but no input from a stage higher than the first stage, and a third stage of modulo units (Delay=3) may be arranged to receive at least one input from the second stage of modulo units but no input from a stage higher than the second stage, and so on. It will therefore be appreciated that all of the modulo units of a given stage can be considered to present substantially the same delay in the processing pipeline of an input x. The outputs of the logarithmic tree are the 15 outputs of the modulo units at the top-level nodes indicated in FIG. 1 by 0, t for t=1, 2, . . . 15.

The processing logic 402 is configured to operate on the blocks of input variable x. The processing logic 402 comprises a network of modulo units each configured to perform the modulo operation mod d. The modulo units of the processing logic are arranged at design time in the manner described herein so as to minimise both delay and the number of required modulo units. The connections between modulo units and the inputs from the input data store 401 may be hardwired in the binary logic circuit. The parameters d and w are known at design time such that the binary logic circuit may be configured as a fixed function hardware unit optimised to perform division by d.

It is helpful to refer to blocks of the input x rather than bits because, depending on the modulo operation being performed, a modulo unit of the first stage may operate on more than a pair of bits. Each of the first stage modulo units is configured to receive an adjacent pair of blocks of bits of x, each block comprising r contiguous bits of x. The length of r may depend on the modulo operation being performed. For example, a first stage mod 3 operation used in processing logic configured to perform a division by 3 may receive a pair of bits from the input x, i.e. two one-bit blocks (r=1). A modulo unit may receive more than two bits. For example, a first stage mod 5 operation used in processing logic configured to perform a division by 5 may receive four bits from the input x as two blocks of two bits (r=2). If fewer bits were received the result of the modulo operation would trivially be the input bits to that modulo unit. A modulo unit configured to perform the operation mod 5 could receive more than four bits but this would typically increase the complexity of the modulo unit.

Modulo units in higher stages may operate on a different number of bits to modulo units of the first stage. In general the number of bits output from a modulo unit performing the operation mod d will be the number of bits needed to represent d−1. Thus the number of bits output by a mod 3 unit is 2 bits and the number of bits output by a mod 5 unit is 3 bits. Since higher stage modulo units receive at least one input from a lower-stage modulo unit, the number of bits each higher stage modulo unit operates on depends on the modulo operation being performed at the modulo units of the logarithmic tree.

The number of blocks M in input x for a block width (in general) of r bits is approximately $$\left\lceil \frac{w}{r} \right\rceil.$$

Where r divides evenly into w the number of input blocks will typically be equal to $$\left\lceil \frac{w}{r} \right\rceil,$$

but where r does not divide evenly into w there are various options for handling the extra bits. For example, the additional bits may be treated as a further block of the input which has a bit width of less than r bits; one or more of the input blocks may be increased in size beyond r bits in order to accommodate the additional bits; one or more padding bits (e.g. 0s located so as to not affect the value of a block) may be added to one or more blocks such that all blocks are of r bits. As is explained below, increasing the bit width of the input to a modulo unit will typically increase the complexity of the modulo unit, but there can be situations where this is nonetheless advantageous (e.g. because it obviates the need for a further modulo unit).

Each block received at a modulo unit may be received as a separate input and combined according to the bit alignment of the blocks so as to yield a value on which the modulo unit is to perform its mod d operation. For a general modulo unit in the tree which receives as its inputs a pair of output values from lower-stage modulo units, those output values representing the result of modulo operations on blocks of x can always be combined to represent the result of the modulo operation on the totality of the blocks of x in respect of which the lower-stage modulo operations were performed. In other words, the result of a modulo operation on blocks a to b of x can be combined with the result of a modulo operation on adjacent blocks c to d of x (where c=b+1) so as to represent the result of a modulo operation on blocks a to d. It is well known in the art how such modulo results may be combined.

Figure 5:
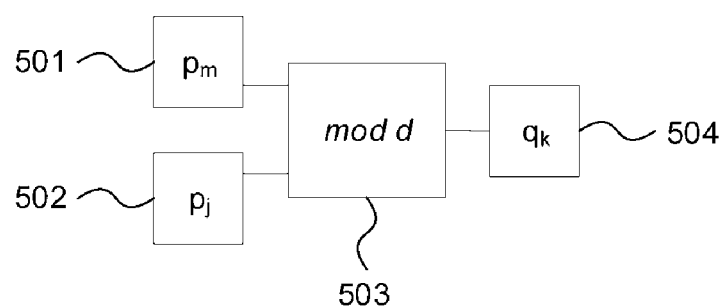
FIG. 5 shows a modulo unit of a logarithmic tree at the processing logic of FIG. 4.

A modulo unit 503 configured to perform a mod d operation on a pair of inputs is shown in FIG. 5. The unit receives a pair of inputs 501 and 502 which are combined to represent an input value on which the modulo unit 503 performs the mod d operation so as to generate output 504. The bit width of the inputs may depend on the size of d. For example, for d=3 the inputs of the first stage modulo units may each be 1-bit; for d=5 the inputs of the first stage modulo units may each be 2-bits.

A modulo unit could be configured to receive inputs of different bit widths, although again this would typically increase the complexity of the modulo unit. However, such an arrangement can be advantageous in order to minimise the overall complexity of the processing logic. For example, where the division being performed at the processing logic is a division by 5 but the bit width of the input is odd it can be advantageous for the modulo units of the first delay stage to each receive a pair of two-bit modulo inputs with the exception of one or more modulo units of the first delay stage being configured to receive a two-bit input and a three-bit modulo input. The use of such more complex modulo units can provide an optimal trade-off in terms of minimising the overall complexity of the processing logic where the input x does not divide evenly into r-bit blocks.

In order to define arrangements of nodes in a logarithmic tree which realise the benefits described herein, it is advantageous to adopt the following notation. The input x is divided into a plurality of M blocks, each block comprising r bits as appropriate to the number of bits required by the first stage of modulo units. Not all of the input blocks may be of the same bit width—for example, for some input widths w it can be advantageous for one or more blocks to be smaller or larger than r. Instead of numbering the blocks of x from its least significant bit, the blocks of x are numbered from its most significant bit. In this manner, the notation x[i:j] refers to blocks i to j of x where i and j are the $i^{th}$ and $j^{th}$ blocks of x, respectively, and i<j. This notation will be used throughout the specification to refer to particular bits of the input x and the output y.

Figures 7, 8:
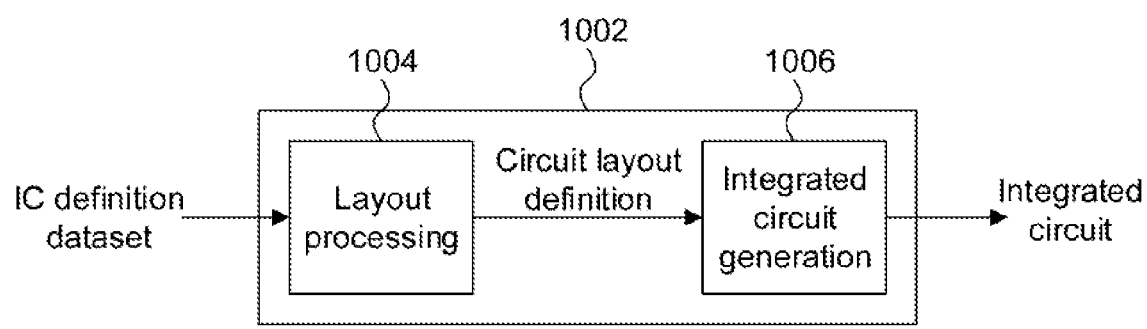
FIG. 7 illustrates block positions in a 7-block binary value, x.
FIG. 8 is a schematic diagram of an integrated circuit manufacturing system.

For example, a binary input x comprising seven blocks is shown in FIG. 7 in which each block comprises a single bit, the block comprising the most significant bit (MSB) is labelled with the bit position "0", and the block comprising the least significant bit (LSB) is labelled with the bit position "6". In this example each block is a bit and so each block position is a bit position. The value of x[2:5] is therefore "0110" and the value of x[1:4] is "1011". Note that the most significant bit refers to the most significant bit position of the available bit width of the respective value. For instance, in the example shown in FIG. 7, the most significant bit is therefore bit position 0 even though the value of the $0^{th}$ block is "0".

It is further helpful to refer to blocks of the output x' from the logarithmic tree 404 rather than bits because a modulo unit of the logarithmic tree may provide more than one bit at its output 504. x' may be a collection of output blocks rather than a single concatenated binary value, each block representing the value of a modulo calculation x[0:m]mod d for m∈{1:M−1}—i.e. a residue in the language introduced below. The output blocks of x' may be of different bit width to the input blocks of x. For example, a modulo unit configured to perform a mod 5 will typically provide a 3-bit output block whereas its input may be two 2-bit input blocks. It is further advantageous to refer to the block positions of the logarithmic tree output x' in the same manner as for the input x, with the lowest block position corresponding to the most significant bit and the highest block position corresponding to the least significant bit.

In binary, the value of the output bits of the result of the division $$y = \frac{x}{d}$$

may be derived from calculations of the remainders of sets of the most significant bits of the input x. In general, the value of the $(m+1)^{th}$ block of the final output y may be derived from the remainder of the m most significant blocks of x. Since x mod d represents the remainder of the division $$\frac{x}{d},$$

all of the required remainder values are performed at the logarithmic tree and found in its collection of output modulo calculations, x'. It follows that the result of the division $$y = \frac{x}{d}$$

may be derived from the result of calculating the remainders of each set of the m most significant blocks of x after division by d for each m in the range of integers {1:M−1}, where M is the total number of blocks of x. x' represents the set of results of such remainder calculations and may be processed at output logic 405 in order to yield the bits of the processing logic output y which represents the results of the division $$\frac{x}{d}.$$

In binary, the remainder of x[i:j] after division by d is equivalent to the value of x[i:j]mod d. The remainder of the m most significant blocks of x after division by d may therefore be expressed as x[0:m]mod d. Since modulo operations are associative, the value of each x[0:m]mod d may be calculated by performing one or more modulo operations, for example where m=a+b:

$$x[0:m] \bmod d = ((x[0:a] \ll b + x[a+1:m]) \bmod d$$
$$= ((x[0:a] \ll b) \bmod d + x[a+1:m] \bmod d) \bmod d$$
$$= (((x[0:a] \bmod d) \ll b) + x[a+1:m] \bmod d) \bmod d$$

This relationship establishes how the modulo value of the whole input x can be formed by calculating the individual modulo values of sets of the most significant bits of x using a logarithmic tree of modulo units.

Each modulo operation may be performed at a modulo unit of the processing logic 402. Each modulo unit may be fixed function circuitry configured to perform a predetermined modulo operation on a pair of blocks of predefined bit widths so as to form x[i:j]mod d where x[i:j] are the blocks of x in respect of which an output is to be formed by the modulo unit. Thus, the binary logic circuit 400 reduces a potentially complex division operation to performing a set of modulo calculations on bit selections from the input variable x.

As has been explained, the number of input bits provided to each modulo unit may depend on the size of the modulo operation being performed: for example, for division by three where d=3, each modulo unit may receive a pair of bits as inputs (e.g. two 1-bit inputs); for division by five where d=5, each modulo unit may receive four bits as inputs (e.g. two 2-bit inputs).

An efficient logarithmic tree arrangement of modulo units at the processing logic 402 for evaluating division by a constant integer will now be described. It is useful in the following examples to refer to each value x[i:j]mod d as a 'residue' which will be represented as x⟨i:j⟩. The result of the division operation $$\frac{x}{d}$$

may be derived from the set of residues x⟨0:j−1⟩, j=1, 2 ..., M. The logarithmic tree 404 is configured to evaluate residues at its modulo units, with the set of residues x⟨0:j−1⟩ representing the outputs of the logarithmic tree and, collectively, x'. The output logic 405 is configured to combine the set of residues x⟨0:j−1⟩ with bits of the input x in the manner described above so as to form the output ratio $$y = \frac{x}{d}.$$

Note that in the notation x[i:j], the identifiers i and j refer to input blocks to the logarithmic tree 404 of modulo units rather than individual bits of x. Each input to the logarithmic tree is an input to a modulo unit in a first stage of the logarithmic tree. Only in the case where each input is a single bit do the identifiers i and j refer to bit positions. For example, when d=5 each input to the logarithmic tree of modulo units may be 2-bits and so, say, i=0 refers to the most significant block (rather than the most significant bit) and, say, j=3 refers to the fourth most significant block (rather than the fourth most significant bit).

The least significant output block of x' from the logarithmic tree is formed using all the blocks of the input x since it may be represented as the residue x⟨0:M−1⟩. The least significant $P^{th}$ output block therefore requires the greatest number of modulo operations to form and represents the maximum delay at the logarithmic tree. For example, for a 16-bit input and a binary logic circuit configured to perform division by 3, where each input block comprises a single bit (i.e. r=1), the least significant bit of the output is given by the residue x⟨0:15⟩ and hence the calculation x[0:15]mod 3 which may be calculated by combining a plurality of residues of smaller sets of most significant bits of x.

The output logic 405 of the processing logic 402 is configured to form the bits of the output $$y = \frac{x}{d}$$

from the output x' of the logarithmic tree 404. Each of the blocks of x' represents the result of a mod d modulo operation on input blocks of x and is therefore the remainder of the division of those input blocks of x by divisor d. It will be immediately apparent to a person skilled in the art of modulo logic how the output y may be derived from the blocks of x'.

A brief example will now be provided for the case that the input block width is 1 bit and each of the modulo output residues x'[m]=x⟨0:m⟩ from the modulo logic provides 1 bit of the output y. The bits of y are numbered such that the $m^{th}$ bit of y is derived in dependence on the $m^{th}$ output residue x'[m]=x⟨0:m⟩ where m=1 is the most significant bit of y. For example, the block of x' provided by modulo unit 201 in FIG. 2 for the case m=6 is the residue x'[6]=x[0:6]mod d from which the value of y[6] may be derived. The value of the $m^{th}$ bit of y may be derived as follows. If the following equality is true for a given residue x'[m] then the value of the $m^{th}$ output bit y[m]=0:

$$x\langle 0:m\rangle = (x\langle 0:m-1\rangle \ll 1)\&x[m]$$

where & represents a concatenation operation and <<1 a left shift by 1 bit. If the above equality is not true for the residue x'[m] then y[m]=1.

Persons familiar with modulo logic will readily appreciate how to extend this exemplary case to cases where the input block width is greater than 1 bit.

The modulo units of the binary logic circuit 400 are arranged in a logarithmic tree and hence the number of modulo operations required to calculate the least significant output block of the tree is given by $\lceil \log_2 M \rceil$, where M is the number of input blocks. This represents the delay intrinsic to the binary logic circuit when performing the division calculation using a tree of modulo operations: in other words, the delay introduced in calculating the least significant output block of x' defines a delay envelope for the binary logic circuit 402. Thus, for a logarithmic tree having 16 input blocks the number of stages of modulo operations is 4 (e.g. in the case x is 16-bit and the input block length is 1 bit) and for a logarithmic tree having 32 input blocks the number of stages of modulo operations is 5 (e.g. in the case x is 32-bits and the input block length is 1 bit, or in the case x is 64-bits and the input block length is 2 bits).

Each modulo unit may be considered to take the same amount of time to perform its modulo operation (e.g. one time unit), such that the delay may be considered to scale linearly with the number of modulo operations on the critical path required to form a block of the output x' of the tree.

The result of each residue operation $x\langle i{:}j\rangle$ may comprise one or more bits according to the size of the divisor, d (and hence the particular mod d operations being performed), the number of input bits to the modulo units involved in calculating the residue, and design considerations which may lead to the logarithmic tree being configured to introduce—for example—additional padding bits, or shift operations so as to ensure proper alignment of the bits from each stage of the logarithmic tree.

For a given modulo operation, a minimum output bit width will be required to express the range of possible outputs. For example, the operation mod 3 requires a minimum output width of 2 bits, and the operation mod 5 requires a minimum output width of 3 bits. Since the output blocks of the logarithmic tree are given by $x\langle 0{:}j\rangle$ it follows tat the minimum output bit width implied by the size of the divisor, d, is also the minimum size of the output blocks of x'. Typically the minimum output block size implied by the size of the divisor, d, will be the optimal block size because this minimises the complexity of the modulo units.

It should be noted that since the input block size to the first stage modulo units may not be the same as the output block size from the modulo units, the bit width of inputs to higher stages of modulo units may not be the same as the bit width to the first stage of modulo units. For example, if the modulo operation performed at each unit is mod 3, the minimum bit width of the output from each modulo unit is 2 bits. In the case that the input block size from x is 1 bit, the number of bits provided to each modulo unit in the first stage is 2 bits from a pair of 1 bit inputs, but the number of bits provided to each modulo unit in each subsequent stage is either 3 or 4 bits: 3 bits for a modulo unit that receives as its inputs a block from x and the output of a lower-stage modulo unit; and 4 bits for a modulo unit that receives as its inputs a pair of outputs from lower-stage modulo units. Whilst all of the modulo units of logarithmic tree are configured to perform the same mod d operation, the modulo units may differ slightly in their logic so as to handle different input widths and, where $d{\neq}2^n{+}1$, different alignments at different nodes of the tree.

Each modulo operation is performed by a modulo unit which represents a 'node' of the logarithmic tree. The output of each modulo operation represents a residue $x\langle i{:}j\rangle$. In describing the arrangement of the logarithmic tree of modulo units, it is helpful to define a set of modulo operations which represent a 'skeleton' of the tree. The skeleton comprises those nodes performing residues $x\langle i{:}j{-}1\rangle$ for which there exists a positive integer, k, that satisfies $j{-}i{=}2^k$ and where i is an integer multiple of $2^k$. In general, the number of modulo operations required to form the residue $x(i{:}j{-}1)$ will be $\lceil \log_2(j{-}i) \rceil$. Thus the residues of the skeleton may be grouped according to their delay as follows:

Delay=0 $x\langle 0{:}0\rangle$, $x\langle 1{:}1\rangle$, $x\langle 2{:}2\rangle$, $x\langle 3{:}3\rangle$, ...

Delay=1 $x\langle 0{:}1\rangle$, $x\langle 2{:}3\rangle$, $x\langle 4{:}5\rangle$, $x\langle 6{:}7\rangle$, ...

Delay=2 $x\langle 0{:}3\rangle$, $x\langle 4{:}7\rangle$, $x\langle 8{:}11\rangle$, $x\langle 12{:}15\rangle$, ...

Delay=k $x\langle 0{:}2^k{-}1\rangle$, $x\langle 2^k{:}2{\times}2^k{-}1\rangle$, $x\langle 2{\times}2^k{:}3{\times}2^k{-}1\rangle$, $x\langle 2{\times}2^k{:}3{\times}2^k{-}1\rangle$, ...

All of the modulo units in a given delay group may perform their respective operations in parallel.

The output residues are $x(i{:}j{-}1)$, $j{=}2\ldots$, M. It is desirable to form the output residues as cheaply as possible, i.e. with the minimum number of modulo operations (and hence modulo units) and at the minimum possible overall delay.

The modulo unit may comprise any suitable logic circuit for performing the appropriate mod d operation. The modulo units of the processing logic 402 are connected together in accordance with the principles described herein so as to form a logarithmic tree. Each modulo unit represents a node of the tree at which a modulo operation is performed. Typically modulo units will be directly connected together with no intervening registers between the stages of the tree. The speed of the processing logic is therefore limited by the delay through the gates of the processing logic.

Consider an example in which the input x has a bit width of w=32, the division operation is divide by 3, and the input block size is 1 bit. The number of input blocks in x is therefore 32. The minimum possible delay in order to form the output using a logarithmic tree of modulo units is therefore $\log_2 32{=}5$. This represents the delay envelope for the logarithmic tree 404 of binary logic circuit 402 configured to perform division by 3 on a 32-bit input.

It is useful to introduce the Hamming measure of an integer, denoted H(j). It is defined as the number of ones in its binary representation, e.g. H(9decimal)=H(1001binary)=2. All required residues $x\langle 0{:}j{-}1\rangle$ where the input blocks x[0:j−1] have a Hamming weight H(j)=1 will be in the skeleton of the tree. All required residues with H(j)=2 can be computed by combining a two residues in the skeleton using the same modulo operation, e.g. $x\langle 0{:}5\rangle{=}x\langle 0{\cdot}x\langle 4{:}5$, $x\langle 0{:}9\rangle{=}x\langle 0{:}7\rangle{\cdot}x\langle 8{:}9\rangle$ and $x\langle 0{:}11\rangle{=}x\langle 0{:}7\rangle{\cdot}x\langle 8{:}11\rangle$. The · operator indicates a modulo operation according to the fixed divisor of the binary logic circuit. Thus, for example in the case when d=3, $x\langle 0{:}3\rangle{\cdot}x\langle 4{:}5\rangle{=}\langle x[0{:}3] \& x[4{:}5]\rangle$ mod 3, where & represents a concatenation operation.

In general, those inputs x[0:j−1] having a Hamming weight H(j)=k can be computed by combining a residue calculated in respect of those blocks of x having H(j)=k−1 and a residue from the skeleton, e.g. $x\langle 0{:}13\rangle{=}x\langle 0{:}11\rangle{\cdot}x\langle 12{:}13\rangle$. It is noted that the delay in forming $x\langle 0{:}7\rangle$ is 3 and therefore the delay in forming $x\langle 0{:}11\rangle$ is 4 and the delay in forming $x\langle 0{:}13\rangle$ is 5, which is within the delay envelope for a 32 input logarithmic tree.

Conventionally, a logarithmic tree 100 of modulo units 101 for performing a division of a 16-bit input by a fixed integer would be arranged as shown in FIG. 1. It can be seen that the maximum delay is $\log_2 16{=}4$. Each modulo unit 101 is configured to combine the bits of its pair of inputs and perform a modulo operation on the resulting bits. For example, if the tree 100 is configured to perform a division by 3, each modulo unit 101 of the first stage with delay=1 would perform the operation modulo 3 on a pair of 1-bit inputs from x so as to yield a pair of output bits. A mod 3 operation requires 2 bits to express the full range of output values. The output of each modulo unit 101 is therefore at least 2 bits, which means the total number of bits on which modulo units at the second and higher stages operate is 3 or 4. For example, modulo unit 104 may operate on 3 bits since one of its inputs is a 1 bit block from x, whereas modulo unit 103 may operate on 4 bits since it receives two 2-bit outputs from modulo units of the first stage.

Intermediate modulo units, such as 102 in FIG. 1, do not generate an output residue x⟨0:j−1⟩ of the logarithmic tree and are instead used as inputs to subsequent modulo units in the tree. For example, modulo unit 102 generates the residue x⟨2:3⟩ which is used as an input to modulo unit 103 which calculates residue x⟨0:3⟩.

In FIG. 1, each of the upper level modulo units of the logarithmic tree 100 which provide the outputs x⟨0:j−1⟩ are labelled with the notation s, t where s and t indicate the most significant and least significant input blocks, respectively, of a contiguous set of blocks which contribute to the output calculated by that modulo unit. For example, the output 0,3 is calculated based on input blocks 0, 1, 2 and 3. This notation is also used in FIGS. 2 and 3. Each modulo unit may be referred to as a node of the logarithmic tree.

Figure 2:
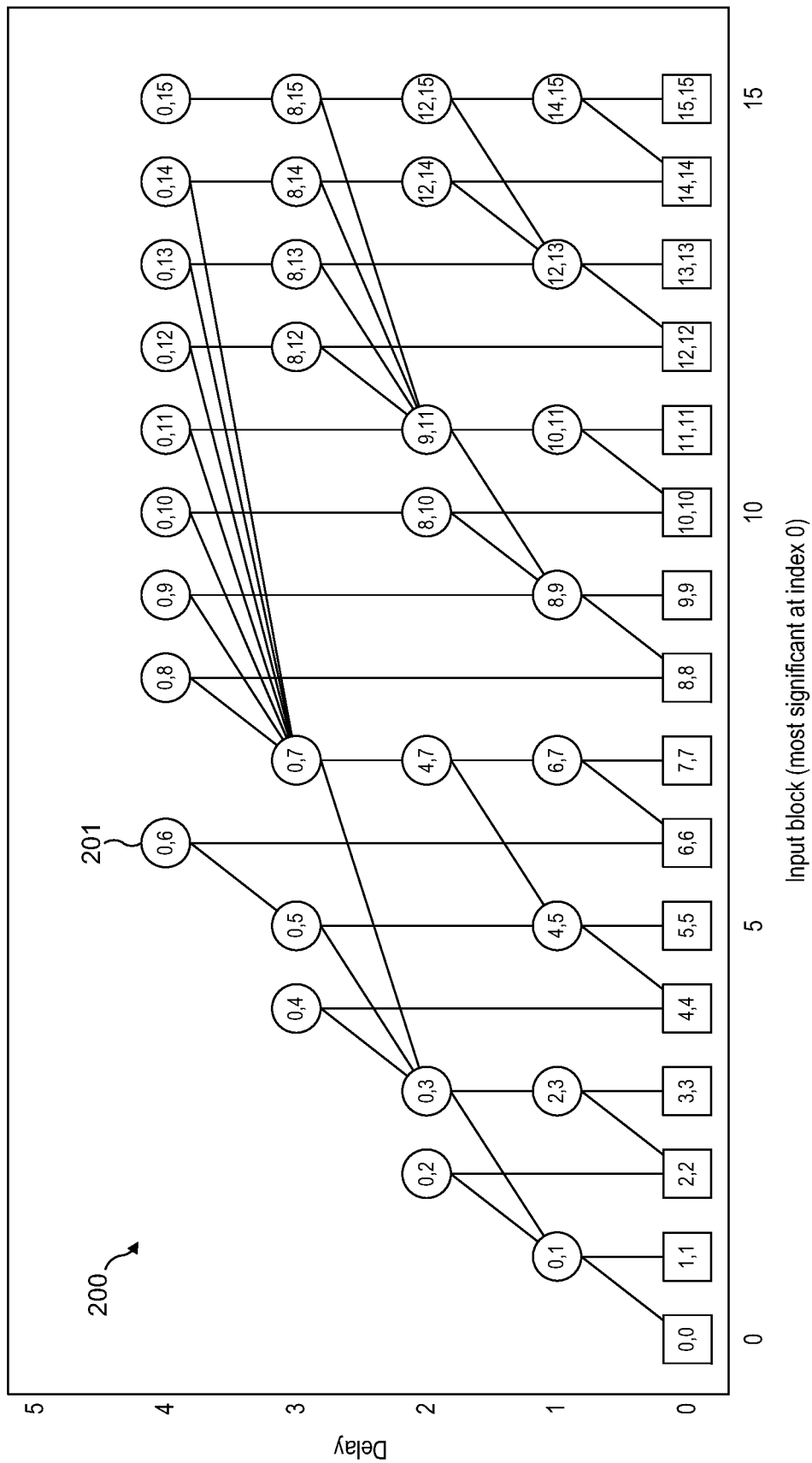
FIG. 2 shows an improved logarithmic tree of modulo units for evaluating binary division of a 16-bit variable input by a constant integer divisor.

It will be observed that the conventional logarithmic tree 100 requires 32 modulo units in order to form all of the output residues required to determine the result of a division operation. An improved logarithmic tree 200 also having 16 inputs is shown in FIG. 2. Tree 200 operates within the same minimum delay envelope in that it requires a maximum of 4 modulo operations on the critical path to form an output residue, but it requires only 31 modulo units and therefore enables a saving in chip area.

FIG. 1 further illustrates how the 16 input logarithmic tree would conventionally be extended to handle 17 input blocks. Moving to 17 inputs increases the delay by one unit because $\lceil \log_2 17 \rceil = 5$. Modulo unit 106 would be added at the fifth delay stage so as to calculate output residue x[0:16] based on available residue x[0:15] and the additional input 105. Moving to 17 input blocks using a conventional logarithmic tree therefore increases the number of required modulo units to 33. An improved logarithmic tree 300 having 17 input blocks is shown in FIG. 3 which requires only 27 modulo units.

The particular improved examples shown in FIGS. 2 and 3 will first be described and then the principles for forming an improved logarithmic tree for any number of inputs will be set out. The principles herein enable an improved logarithmic tree to be formed having a reduced number of modulo units compared to conventional logic where the number of inputs is greater than 8. Compared to conventional logic, the reduction in the number of modulo units in the logarithmic tree increases as the number of input blocks increases.

FIG. 2 reduces the number of modulo units by recognising that modulo operations can be deferred until later in the tree provided that the delay envelope is not exceeded—i.e. the delay $\log_2 M$ where M is the number of inputs to the logarithmic tree. In the example shown in FIG. 2, the modulo unit 201 providing output 0,6 is moved to the final stage with a delay of 4 and performed along with the other final stage modulo operations 0,8 to 0,15. In this case, modulo unit 201 combines the output 0,5 with input 6 which enables modulo unit 104 in FIG. 1 to be removed from the tree.

Figure 3:
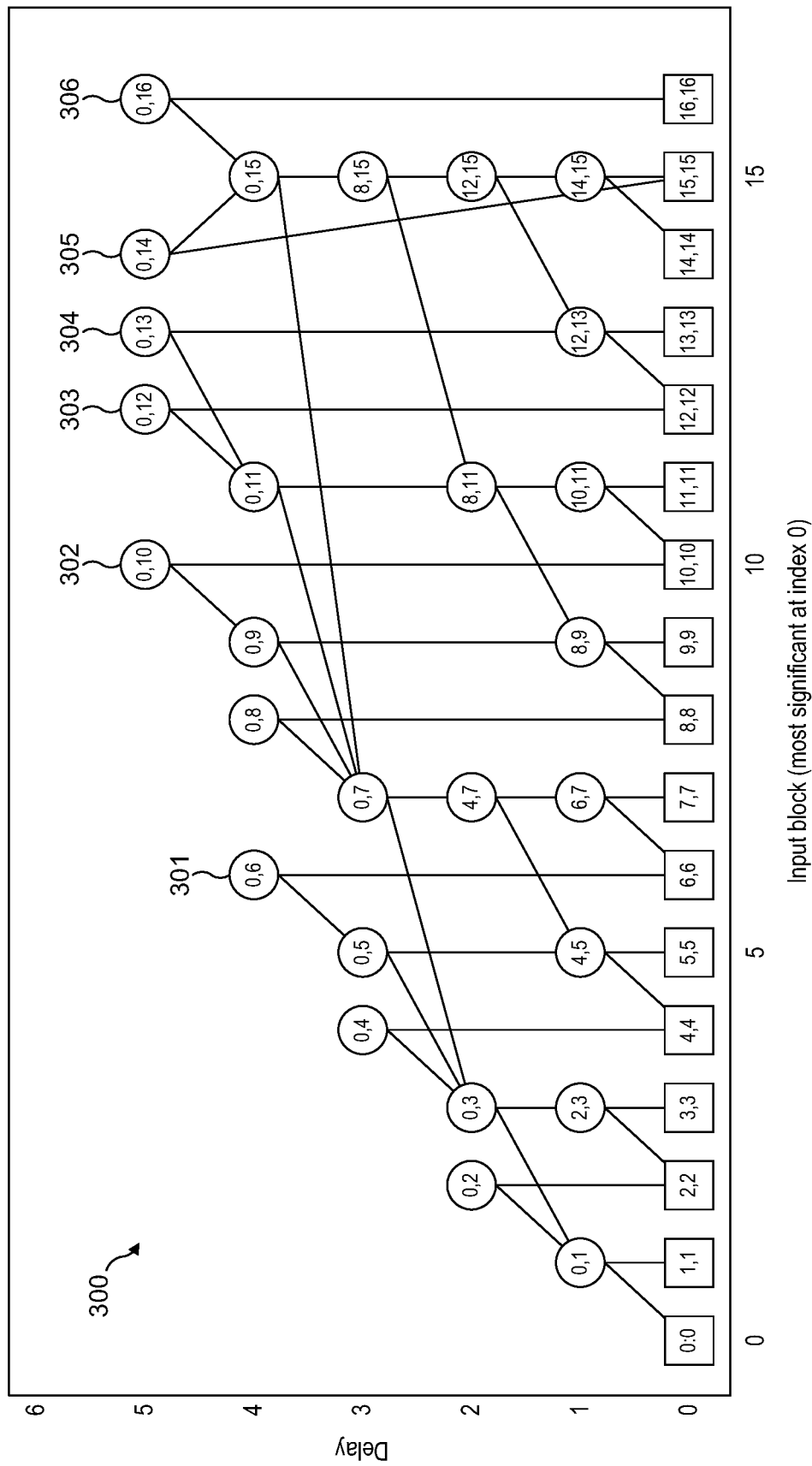
FIG. 3 shows an improved logarithmic tree of modulo units for evaluating binary division of a 17-bit variable input by a constant integer divisor.

FIG. 3 shows a second improved logarithmic tree 300 having modulo units arranged according to the principles described herein. Logarithmic tree 300 represents the most efficient solution for a logarithmic tree having 17 input blocks and enables 6 modulo units to be removed compared to the design of a convention logarithmic tree for 17 input blocks. The logarithmic tree 300 is modified over conventional designs so as to make use of the additional delay which is necessarily introduced by the addition of the 17$^{th}$ input when compared to the 16 input case. With 17 input blocks the delay envelope is $\lceil \log_2 17 \rceil = 5$ because an additional modulo operation must be performed at modulo unit 306 in order to form the least significant bit of the result of the division operation.

In addition to including the optimisation in forming the output 0,6 at modulo unit 301 as described above with respect to FIG. 2 for the 16 input case, the logarithmic tree 300 similarly defers the calculation of outputs 0,10, 0,12, 0,13 and 0,14 to the final stage of modulo calculations. This is illustrated in FIG. 3 by the modulo units 302-305 at the delay=5 level. In particular, the output 0,14 at modulo unit 305 is formed by performing the modulo operation on the output 0,15 and the negative value of input 15. This 'subtraction' of the output of one modulo unit from another represents a saving of one modulo unit over a conventional configuration which would see a first modulo unit being added to combine the outputs of nodes 12,13 and 14,14, and a second modulo unit being added to combine the output of that first modulo unit with that of node 0,11.

In total the optimizations present in the logarithmic tree shown in FIG. 3 enable six modulo units to be removed when compared to a conventional implementation of a 17-input logarithmic tree of modulo units arranged to perform a binary division operation by a fixed divisor (see FIG. 1 including node 106).

The above examples relate to the case where the logarithmic tree is configured to perform division by 3 and the input blocks of x are a single bit. For larger divisors a greater number of inputs may be required at each modulo unit. For example, for division by 5 with each modulo unit performing a mod 5 operation, the input blocks of x may generally be 2-bits in length (there may be one or more blocks which are shorter or longer in length, depending on whether the given block length divides evenly into the bit width of x). The complexity of the logarithmic tree typically increases as the divisors get larger since the logic at each modulo unit is more complex and wider datapaths are required through the binary logic circuit.

The improved logarithmic trees described herein maintain the same critical delay as for conventional logarithmic trees, but reduce the number of required modulo computations and hence the chip area consumed by the modulo units arranged to perform those computations.

Figure 6:
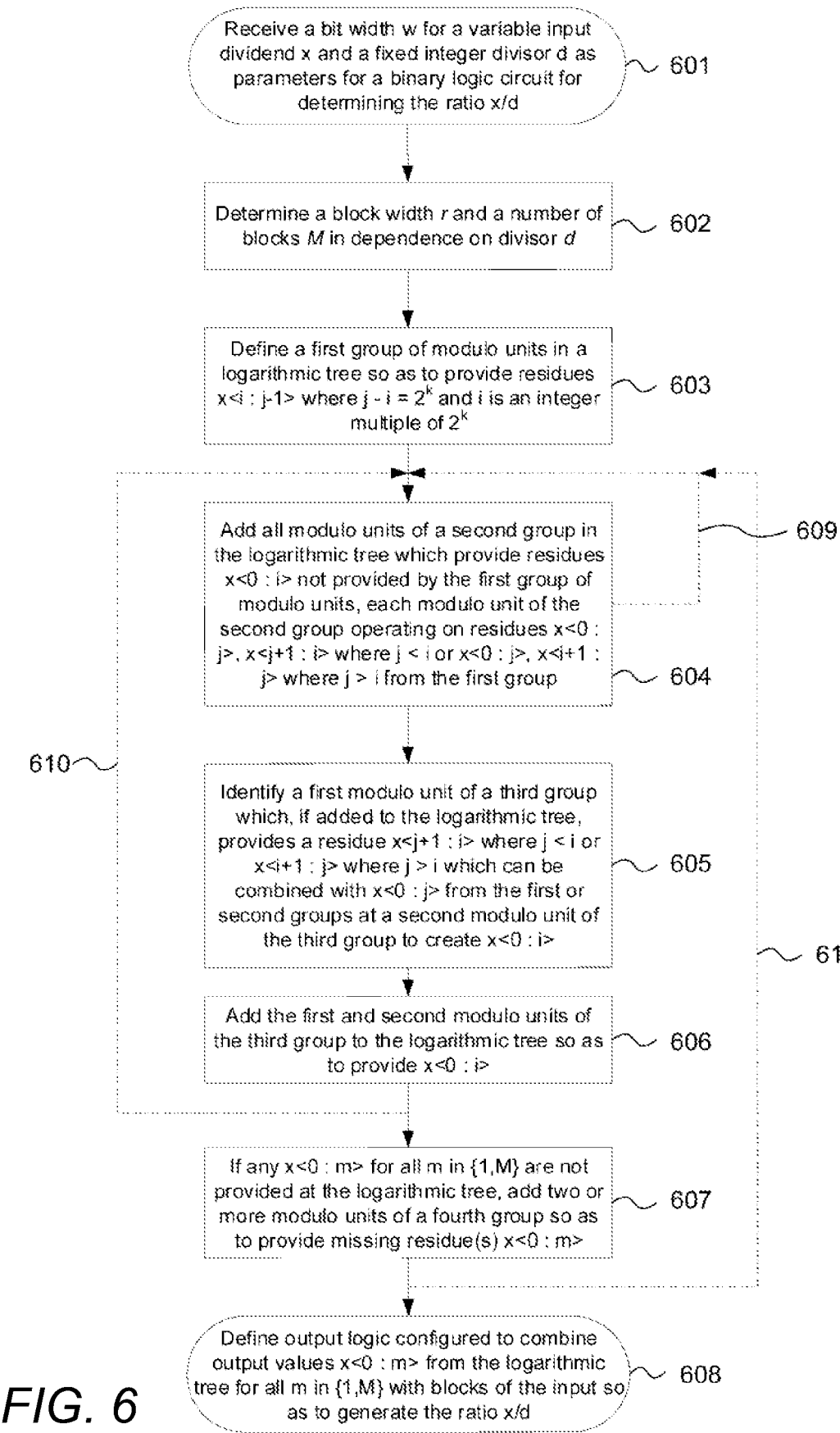
FIG. 6 is a flowchart illustrating an exemplary method for designing a logarithmic tree according to the principles described herein.

A general approach for generating an optimised logarithmic tree for performing the division $$\frac{x}{d}$$

will now be described with respect to FIG. 6. The logarithmic tree comprises a plurality of modulo units each configured to perform the same mod d operation on a pair of input values. Such a method may be followed in order to synthesise an improved binary logic circuit for performing the division $$\frac{x}{d}.$$

For example, synthesis software may be configured to employ the process set out below so as to generate a binary logic circuit comprising a logarithmic tree configured in accordance with the principles described herein.

In order to synthesise a logarithmic tree for a fixed function binary logic circuit, the maximum bit width w of the variable input dividend x will be known at design time as will the fixed integer divisor d. These may be received as parameters at the outset of the design process, as represented by 601 in FIG. 6. One or both of the number of blocks M into which the blocks of x are divided and the general block size r may also be passed as parameter(s). Alternatively, M may be determined programmatically. For example, as shown by 602 of FIG. 6, M may be derived in dependence on the divisor d. For example, the block size r may be selected to be the same number of bits as is required to express the full range of output of an operation xmod d.

For a given bit width w and block size of the variable input x the delay envelope may be calculated representing the minimum delay necessary for a logarithmic tree to generate its complete set of outputs. The delay envelope is given by $\lceil \log_2 M \rceil$ where M is the number of blocks in the input.

A. At 603 a skeleton of the logarithmic tree is created comprising a first group of modulo units arranged to calculate the outputs i,j−1 for which there exists a positive integer, k, that satisfies j−i=$2^k$ and where i is an integer multiple of $2^k$. The output label a, b indicates a modulo unit arranged to calculate the value of the residue x[a:b]mod d from blocks a to b of input x. The modulo units of the skeleton are connected together so as to generate the defined set of outputs i,j−1 without requiring any further modulo units— i.e. at least some of the modulo units receive as inputs the outputs of other modulo units of the defined set. The modulo units of the skeleton may be connected together according to the arrangement of conventional logarithmic trees.

B. For all outputs 0,i which are not provided by the first group of modulo units of the skeleton, at 604 add modulo units to the logarithmic tree as follows. For a required output 0,i, if there exists a pair of nodes 0,j and j+1, i where j<i or a pair of nodes 0,j and i+1, j where j>i then combine those nodes in order to create the required output within the delay envelope. It can be advantageous to select a sign for each node so as to create the required output—e.g. some nodes may be assigned a negative value in a modulo operation so as to achieve the required output. Should there be several options available it is advantageous to pick a pair with the shortest delay. Repeat B as indicated by loop 609 until no further nodes can be added.

C. For any further outputs 0,i which are required, at 605 identify whether it is possible to create a node j+1, i where j<i or a node i+1, j where j>i which can be combined with an existing node 0,j in order to create the required output 0, i within the delay envelope. If so at 606 add the node and the required output node 0,i. It can be advantageous to select a sign for each node so as to create the required output—e.g. some nodes may be assigned a negative value in a modulo operation so as to achieve the required output. Should there be several options available it is advantageous to pick a pair with the shortest delay. Repeat B and C as indicated by loop 610 until no further nodes can be added.

D. For any outputs 0,i which are still missing, at 607 create those nodes in any suitable manner by adding two or more nodes in order to create the required output node within the delay envelope. A nested linear search may be used to identify a set of intermediate nodes that may be required to form a given output node. Repeat B to D as indicated by loop 611 until no further nodes can be added.

At 608, suitable output logic is defined for combining the output residues x⟨0:i⟩ from the logarithmic tree with blocks of the input x so as to generate the result of the ratio $$\frac{x}{d}.$$

The output logic 405 may be conventional logic known in the art for performing the operations required of the output logic.

Steps B and C above ensure that an advantageous arrangement of modulo units is identified which includes the minimum possible number of modulo units needed to evaluate the division operation $$\frac{x}{d}$$

as a combination of mod d operations on the bits of x. Furthermore, the approach ensures that the delay does not exceed the delay envelope. Steps C and D may not be required in that steps A and B may create all of the required output nodes of the logarithmic tree. Step D may not be required in that steps A to C may create all of the required outputs nodes of the logarithmic tree.

Conventional logarithmic trees for implementing division operations have a time complexity of $\lceil \log_2 M \rceil$ and a circuit area proportional to $M \log_2 M$. The number of modulo units needed in a conventional logarithmic tree will be $$\frac{M \log_2 M}{2}.$$

Improved logarithmic trees configured according to the above approach will have the same critical time complexity but will require fewer modulo units, and therefore the area consumed by the logarithmic tree of the binary logic circuit will be smaller. For fewer than eight input blocks (M≤8) the improved implementation taught herein results in the same structure as conventional logarithmic trees, but as M grows the improvement in terms of the reduction in number of modulo units becomes larger, both in absolute and relative terms. For large values of M the number of nodes tends to $$\frac{M \log_2 M}{4},$$

i.e. half the number of nodes required in conventional implementations of logarithmic trees.

For example, a logarithmic tree configured to perform a division by 3 according to the principles herein for a 32-bit input typically benefits from a 5% reduction in circuit area compared to conventional logarithmic tree designs.

The principles described herein typically provide logarithmic trees with an increased number of nodes in the highest stage at the top of the delay envelope compared to conventional approaches. For example, in FIG. 3, five modulo units (302 to 306) are provided in the fifth stage whereas the corresponding 17-input tree in FIG. 1 has only one modulo unit (106) in its fifth stage. In general the number of nodes in the highest stage of a conventional logarithmic tree is $M-2^u$ where M is the number of input blocks and $2^u$ is the closest power of 2 which is smaller than M, i.e. $2^u < M \leq 2^{u+1}$. For example, in the 16-block input shown in FIG. 1 there are $16-2^3=16-8=8$ nodes at the highest, fourth stage, and in the 17-block input shown in FIG. 1 there are $17-2^4=17-16=1$ node at the highest, fifth stage. Logarithmic trees created in accordance with the principles set out herein will have a greater number of nodes in its highest stage. In particular, in the case that $M=2^k+1$ for some k, logarithmic trees created in accordance with the principles set out herein will have at least two nodes in its highest stage.

The table below lists for various numbers of input blocks the number of modulo units that are required by the improved logarithmic tree structure taught herein compared to the number of modulo units that would be required by conventional logarithmic tree structures. It can be seen that up to 8 input blocks results in a logarithmic tree having the same number of modulo units, but as the number of input blocks increases the improved tree structure enables a substantial and ever-increasing reduction in the number of modulo units required. A step change reduction in the number of modulo units can be observed when the number of input blocks $M=2^v$ for $v \geq 4$.

| Number of inputs | Number of modulo units Improved | Number of modulo units Conventional | Reduction in number of modulo units | Delay |
|---|---|---|---|---|
| "1" | 0 | 0 | 0 | 0 |
| "2" | 1 | 1 | 0 | 1 |
| "3" | 2 | 2 | 0 | 2 |
| "4" | 4 | 4 | 0 | 2 |
| "5" | 5 | 5 | 0 | 3 |
| "6" | 7 | 7 | 0 | 3 |
| "7" | 9 | 9 | 0 | 3 |
| "8" | 12 | 12 | 0 | 3 |
| "9" | 12 | 13 | 1 | 4 |
| "10" | 14 | 15 | 1 | 4 |
| "11" | 16 | 17 | 1 | 4 |
| "12" | 19 | 20 | 1 | 4 |
| "13" | 21 | 22 | 1 | 4 |
| "14" | 24 | 25 | 1 | 4 |
| "15" | 27 | 28 | 1 | 4 |
| "16" | 31 | 32 | 1 | 4 |
| "17" | 27 | 33 | 6 | 5 |
| "18" | 29 | 35 | 6 | 5 |
| "19" | 31 | 37 | 6 | 5 |
| "20" | 34 | 40 | 6 | 5 |
| "21" | 36 | 42 | 6 | 5 |
| "22" | 39 | 45 | 6 | 5 |
| "23" | 42 | 48 | 6 | 5 |
| "24" | 46 | 52 | 6 | 5 |
| "25" | 48 | 54 | 6 | 5 |
| "26" | 51 | 57 | 6 | 5 |
| "27" | 54 | 60 | 6 | 5 |
| "28" | 58 | 64 | 6 | 5 |
| "29" | 61 | 67 | 6 | 5 |
| "30" | 65 | 71 | 6 | 5 |
| "31" | 69 | 75 | 6 | 5 |
| "32" | 74 | 80 | 6 | 5 |
| "33" | 60 | 81 | 21 | 6 |
| "34" | 62 | 83 | 21 | 6 |
| "35" | 64 | 85 | 21 | 6 |
| "36" | 67 | 88 | 21 | 6 |
| "37" | 69 | 90 | 21 | 6 |
| "38" | 72 | 93 | 21 | 6 |
| "39" | 74 | 96 | 22 | 6 |
| "40" | 78 | 100 | 22 | 6 |
| "41" | 80 | 102 | 22 | 6 |
| "42" | 83 | 105 | 22 | 6 |
| "43" | 85 | 108 | 23 | 6 |
| "44" | 89 | 112 | 23 | 6 |
| "45" | 91 | 115 | 24 | 6 |
| "46" | 94 | 119 | 25 | 6 |
| "47" | 96 | 123 | 27 | 6 |
| "48" | 101 | 128 | 27 | 6 |
| "49" | 103 | 130 | 27 | 6 |
| "50" | 106 | 133 | 27 | 6 |
| "51" | 109 | 136 | 27 | 6 |
| "52" | 113 | 140 | 27 | 6 |
| "53" | 116 | 143 | 27 | 6 |
| "54" | 120 | 147 | 27 | 6 |
| "55" | 123 | 151 | 28 | 6 |
| "56" | 128 | 156 | 28 | 6 |
| "57" | 131 | 159 | 28 | 6 |
| "58" | 135 | 163 | 28 | 6 |
| "59" | 139 | 167 | 28 | 6 |
| "60" | 144 | 172 | 28 | 6 |
| "61" | 148 | 176 | 28 | 6 |
| "62" | 153 | 181 | 28 | 6 |
| "63" | 158 | 186 | 28 | 6 |
| "64" | 164 | 192 | 28 | 6 |
| "65" | 133 | 193 | 60 | 7 |
| "66" | 135 | 195 | 60 | 7 |
| "67" | 137 | 197 | 60 | 7 |
| "68" | 140 | 200 | 60 | 7 |
| "69" | 142 | 202 | 60 | 7 |
| "70" | 145 | 205 | 60 | 7 |
| "71" | 147 | 208 | 61 | 7 |
| "72" | 151 | 212 | 61 | 7 |
| "73" | 153 | 214 | 61 | 7 |
| "74" | 156 | 217 | 61 | 7 |
| "75" | 158 | 220 | 62 | 7 |
| "76" | 162 | 224 | 62 | 7 |
| "77" | 164 | 227 | 63 | 7 |
| "78" | 167 | 231 | 64 | 7 |
| "79" | 169 | 235 | 66 | 7 |
| "80" | 174 | 240 | 66 | 7 |
| "81" | 176 | 242 | 66 | 7 |
| "82" | 179 | 245 | 66 | 7 |
| "83" | 181 | 248 | 67 | 7 |
| "84" | 185 | 252 | 67 | 7 |
| "85" | 187 | 255 | 68 | 7 |
| "86" | 190 | 259 | 69 | 7 |
| "87" | 192 | 263 | 71 | 7 |
| "88" | 197 | 268 | 71 | 7 |
| "89" | 199 | 271 | 72 | 7 |
| "90" | 202 | 275 | 73 | 7 |
| "91" | 206 | 279 | 73 | 7 |
| "92" | 210 | 284 | 74 | 7 |
| "93" | 214 | 288 | 74 | 7 |
| "94" | 217 | 293 | 76 | 7 |
| "95" | 219 | 298 | 79 | 7 |
| "96" | 225 | 304 | 79 | 7 |
| "97" | 227 | 306 | 79 | 7 |
| "98" | 230 | 309 | 79 | 7 |
| "99" | 233 | 312 | 79 | 7 |
| "100" | 237 | 316 | 79 | 7 |
| "101" | 240 | 319 | 79 | 7 |
| "102" | 244 | 323 | 79 | 7 |
| "103" | 247 | 327 | 80 | 7 |
| "104" | 252 | 332 | 80 | 7 |
| "105" | 255 | 335 | 80 | 7 |
| "106" | 259 | 339 | 80 | 7 |

-continued

| Number of inputs | Number of modulo units Improved | Number of modulo units Conventional | Reduction in number of modulo units | Delay |
|---|---|---|---|---|
| "107" | 262 | 343 | 81 | 7 |
| "108" | 267 | 348 | 81 | 7 |
| "109" | 270 | 352 | 82 | 7 |
| "110" | 274 | 357 | 83 | 7 |
| "111" | 277 | 362 | 85 | 7 |
| "112" | 283 | 368 | 85 | 7 |
| "113" | 286 | 371 | 85 | 7 |
| "114" | 290 | 375 | 85 | 7 |
| "115" | 294 | 379 | 85 | 7 |
| "116" | 299 | 384 | 85 | 7 |
| "117" | 303 | 388 | 85 | 7 |
| "118" | 308 | 393 | 85 | 7 |
| "119" | 313 | 398 | 85 | 7 |
| "120" | 319 | 404 | 85 | 7 |
| "121" | 323 | 408 | 85 | 7 |
| "122" | 328 | 413 | 85 | 7 |
| "123" | 333 | 418 | 85 | 7 |
| "124" | 339 | 424 | 85 | 7 |
| "125" | 344 | 429 | 85 | 7 |
| "126" | 350 | 435 | 85 | 7 |
| "127" | 356 | 441 | 85 | 7 |
| "128" | 363 | 448 | 85 | 7 |

The principles set out herein can be extended to creating advantageous arrangements of processing nodes in a logarithmic tree where the operation performed at each node is an associative operation. For example, the same logarithmic tree structures described herein can be advantageously used for performing AND, OR and XOR operations where the modulo units (nodes) are replaced by AND, OR or XOR logic, as appropriate. Similar benefits in terms of reduced circuit area and complexity stemming from a reduction in the number of nodes can be achieved.

In the case that the operation performed at each node is not reversible, e.g. an AND or OR operation, it is not possible to 'subtract' one input from another and therefore a logarithmic tree comprising such nodes can combine positive input values at each node but cannot combine a positive input value with a negative input value at a processing node.

In the general case, the processing logic 402 of FIG. 4 comprises a logarithmic tree of processing nodes 404 arranged according to the principles described herein with the modulo units of the examples described above being replaced with the appropriate processing node for the overall operation to be performed by the processing logic. For example, when each processing node is an AND unit configured to combine its respective inputs to perform an AND operation, the processing logic is configured to perform an AND reduction of multiple groups of most significant blocks of a binary input x—i.e. an AND reduction for a plurality of $x[0:1]$, $x[0:2]$, $x[0:3]$, ... $x[0:m-1]$. Such processing logic can be advantageously employed in a leading zero/one counter, or a renormalizer.

In another example, when each processing node is an OR unit configured to combine its respective inputs to perform an OR operation, the processing logic is configured to perform an OR reduction of multiple groups of most significant blocks of the binary input x. For example, when each processing node is a XOR unit configured to perform a XOR operation, the processing logic is configured to combine its respective inputs to perform parity operations on multiple groups of most significant blocks of the binary input x. It will be appreciated that suitable output logic 405 may be required to process the outputs from the logarithmic tree so as to form the relevant final output of the processing logic.

The principles described herein can be especially advantageously applied to processing logic comprising a logarithmic tree configured to operate on at least 24 input blocks, at least 32 input blocks, at least 48 input blocks, at least 64 input blocks, at least 96 input blocks, at least 128 input blocks, at least 196 input blocks, and at least 256 input blocks.

The binary logic circuits of FIGS. 4 and 5 are shown as comprising a number of functional blocks. This is schematic only and is not intended to define a strict division between different logic elements of such entities. Each functional block may be provided in any suitable manner. It is to be understood that intermediate values described herein as being formed by a binary logic circuit need not be physically generated by the binary logic circuit at any point and may merely represent logical values which conveniently describe the processing performed by the binary logic circuit between its input and output.

Binary logic circuits configured in accordance with the principles set out herein may be embodied in hardware on an integrated circuit. Binary logic circuits configured in accordance with the principles set out herein may be configured to perform any of the methods described herein. Binary logic circuits configured in accordance with the principles set out herein may operate on any form of binary representation or related forms, including, for example, two's complement and canonical forms.

Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a binary logic circuit configured to perform any of the methods described herein, or to manufacture a binary logic circuit comprising any apparatus described herein. An integrated circuit definition dataset may be, for example, an integrated circuit description.

There may be provided a method of manufacturing, at an integrated circuit manufacturing system, a binary logic circuit as described herein. There may be provided an integrated circuit definition dataset that, when processed in an integrated circuit manufacturing system, causes the method of manufacturing a binary logic circuit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a binary logic circuit will now be described with respect to FIG. 7.

FIG. 7 shows an example of an integrated circuit (IC) manufacturing system 1002 which is configured to manufacture a binary logic circuit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a binary logic circuit as described in any of the examples herein), process the IC definition dataset, and generate an IC according to the IC definition dataset (e.g. which embodies a binary logic circuit as described in any of the examples herein). The processing of the IC definition dataset configures the IC manufacturing system 1002 to manufacture an integrated circuit embodying a binary logic circuit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a binary logic circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A binary logic circuit for determining the ratio x/d where x is a variable integer input of w bits comprising M>8 blocks of bit width r≥1 bit, and d>2 is a fixed integer, the binary logic circuit comprising:
a logarithmic tree of modulo units each configured to calculate x[a:b]mod d for respective block positions a and b in x where b>a with the numbering of block positions increasing from the most significant bit of x up to the least significant bit of x, the modulo units being arranged such that a subset of M−1 modulo units of the logarithmic tree provide x[0:m]mod d for all m∈{1, M−1}, and:
on the basis that any given modulo unit introduces a delay of 1, all of the modulo units are arranged in the logarithmic tree within a delay envelope of $\lceil \log_2 M \rceil$; and
at least one of the subset of M−1 modulo units is arranged to operate on a binary value comprising the negative value of (a) an output from a modulo unit x[e:f]mod d or (b) input block(s) x[e:f] and the value of x[0:f]mod d so as to calculate x[0:e]mod d, where e and f are block positions in x;
and
output logic configured to combine the outputs provided by the subset of M−1 modulo units with blocks of the input x so as to yield the ratio x/d.

2. A binary logic circuit as claimed in claim 1, wherein divisor $d=2^n \pm 1$ for integer n≥2.

3. A binary logic circuit as claimed in claim 1, wherein the number of blocks of the input is $M=2^v+1$ for integer v≥3 and at least two modulo units are arranged at the maximal delay of $\lceil \log_2 M \rceil$.

4. A binary logic circuit as claimed in claim 1, wherein each modulo unit receives a pair of input values, each input value being, depending on the position of the modulo unit in the logarithmic tree, a block of the input x or an output value from another modulo unit, and each modulo unit being configured to combine its pair of input values and perform its mod d calculation on the resulting combined pair of input values.

5. A binary logic circuit as claimed in claim 1, wherein the modulo units of the logarithmic tree are arranged in a plurality of stages, where no modulo unit of a given stage receives an input value from a modulo unit of a higher stage, the modulo units of a first, lowest stage are each arranged to receive a pair of adjacent blocks from the input x as input values, and the modulo units of each higher $S^{th}$ stage are arranged to receive at least one input from the $(S-1)^{th}$ stage of modulo units.

6. A binary logic circuit as claimed in claim 5, wherein each modulo unit of the first stage is configured to operate on a pair of input values comprising 2r bits.

7. A binary logic circuit as claimed in claim 5, wherein each modulo unit is configured to provide an output value of bit width p bits and each modulo unit of a higher stage is configured to operate on:
a pair of input values comprising r+p bits for a modulo unit arranged to receive one of its blocks from the input x; and
a pair of input values comprising 2p bits for a modulo unit arranged to receive output values from other modulo units as its pair of input values.

8. A binary logic circuit as claimed in claim 1, wherein the number of blocks of the input is $$\lceil \tfrac{w}{r} \rceil.$$

9. A binary logic circuit as claimed in claim 8, wherein $$\lceil \tfrac{w}{r} \rceil \neq \tfrac{w}{r}$$

and one or more of the blocks of the input has a bit width other than r bits, or are padded with bits such that all blocks of the input are of bit width r bits.

10. A binary logic circuit as claimed in claim 1, wherein the bit width of each x[0:m]mod d provided by the logarithmic tree is equal to the minimum bit width p required to express the range of possible outputs of a mod d calculation.

11. A binary logic circuit as claimed in claim 1, wherein the number of blocks of the input is at least 24 blocks.

12. A method of synthesising a binary logic circuit for determining the ratio x/d where x is a variable integer input of w bits comprising M>8 blocks of bit width r≥1 bit, and d>2 is a fixed integer, the binary logic circuit comprising a logarithmic tree of modulo units each configured to calculate x[a:b]mod d for respective block positions a and b in x where b>a with the numbering of block positions increases from the most significant bit of x up to the least significant bit of x, the method comprising:
defining an arrangement of the modulo units of the logarithmic tree such that:
a subset of M−1 modulo units of the logarithmic tree provide x[0:m]mod d for all m∈{1, M−1};
on the basis that any given modulo unit introduces a delay of 1, all of the modulo units are arranged in the logarithmic tree within a delay envelope of $\lceil \log_2 M \rceil$; and
at least one of the subset of M−1 modulo units is arranged to operate on a binary value comprising the negative value of (a) an output from a modulo unit x[e:f]mod d or (b) input block(s) x[e:f] and the value of x[0:f]mod d so as to calculate x[0:e]mod d, where e and f are block positions in x;
and
defining output logic configured to combine output values x[0:m]mod d for all m∈{1, M−1} provided by the subset of M−1 modulo units of the logarithmic tree with blocks of the input x so as to yield the ratio x/d.

13. A method as claimed in claim 12, wherein divisor d=$2^n$±1 for integer n≥2.

14. A method as claimed in claim 12, further comprising arranging the modulo units of the logarithmic tree such that more than M−$2^u$ of the subset of M−1 modulo units are arranged at the maximal delay of $\lceil \log_2 M \rceil$, where $2^u$ is the power of 2 immediately smaller than M.

15. A method as claimed in claim 12, wherein each modulo unit is defined so as to receive a pair of input values, each input value being, depending on the position of the modulo unit in the logarithmic tree, a block of the input x or an output value from another modulo unit, and each modulo unit being configured to combine its pair of input values and perform its mod d calculation on the resulting combined pair of input values.

16. A method as claimed in claim 12, wherein the modulo units of the logarithmic tree are arranged in a plurality of stages, where no modulo unit of a given stage receives an input value from a modulo unit of a higher stage, the modulo units of a first, lowest stage are each arranged to receive a pair of adjacent blocks from the input x as input values, and the modulo units of each higher $S^{th}$ stage are arranged to receive at least one input from the $(S-1)^{th}$ stage of modulo units.

17. A method as claimed in claim 16, wherein each modulo unit of the first stage is configured to operate on a pair of input values comprising 2r bits.

18. A method as claimed in claim 17, wherein each modulo unit is configured to provide an output value of bit width p bits and each modulo unit of a higher stage is configured to operate on:
a pair of input values comprising r+p bits for a modulo unit arranged to receive one of its blocks from the input x; and
a pair of input values comprising 2p bits for a modulo unit arranged to receive output values from other modulo units as its pair of input values.

19. A method as claimed in claim 12, wherein the bit width of each x[0:m]mod d provided by the logarithmic tree is equal to the minimum bit width p required to express the range of possible outputs of a mod d calculation.

20. A non-transitory computer readable storage medium having stored thereon a computer readable dataset description of a binary logic circuit which, when processed in an integrated circuit manufacturing system, causes the integrated circuit manufacturing system to manufacture an integrated circuit embodying the binary logic circuit, the binary logic circuit being for determining the ratio x/d where x is a variable integer input of w bits comprising M>8 blocks of bit width r≥1 bit, and d>2 is a fixed integer, and comprising:
a logarithmic tree of modulo units each configured to calculate x[a:b]mod d for respective block positions a and b in x where b>a with the numbering of block positions increasing from the most significant bit of x up to the least significant bit of x, the modulo units being arranged such that a subset of M−1 modulo units of the logarithmic tree provide x[0:m]mod d for all m∈{1, M−1}, and:
on the basis that any given modulo unit introduces a delay of 1, all of the modulo units are arranged in the logarithmic tree within a delay envelope of $\lceil \log_2 M \rceil$; and
at least one of the subset of M−1 modulo units is arranged to operate on a binary value comprising the negative value of (a) an output from a modulo unit x[e:f]mod d or (b) input block(s) x[e:f] and the value of x[0:f]mod d so as to calculate x[0:e]mod d, where e and f are block positions in x;
and
output logic configured to combine the outputs provided by the subset of M−1 modulo units with blocks of the input x so as to yield the ratio x/d.

* * * * *